United States Patent
Im

(10) Patent No.: US 11,741,424 B2
(45) Date of Patent: Aug. 29, 2023

(54) ARTIFICIAL INTELLIGENT REFRIGERATOR AND METHOD OF STORING FOOD THEREOF

(71) Applicant: LG ELECTRONICS INC., Seoul (KR)

(72) Inventor: Hyojoon Im, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 720 days.

(21) Appl. No.: 16/485,761

(22) PCT Filed: Jun. 10, 2019

(86) PCT No.: PCT/KR2019/006963
§ 371 (c)(1),
(2) Date: Aug. 13, 2019

(87) PCT Pub. No.: WO2020/251067
PCT Pub. Date: Dec. 17, 2020

(65) Prior Publication Data
US 2019/0354926 A1 Nov. 21, 2019

(51) Int. Cl.
*F25D 29/00* (2006.01)
*G06Q 10/087* (2023.01)
*H04N 23/57* (2023.01)

(52) U.S. Cl.
CPC ......... *G06Q 10/087* (2013.01); *F25D 29/005* (2013.01); *H04N 23/57* (2023.01); *F25D 2500/06* (2013.01); *F25D 2600/00* (2013.01); *F25D 2700/06* (2013.01)

(58) Field of Classification Search
CPC .... F25D 29/00; F25D 29/005; F25D 2500/06; F25D 2600/00; F25D 2700/06
See application file for complete search history.

(56) References Cited

U.S. PATENT DOCUMENTS

| | | | | |
|---|---|---|---|---|
| 2006/0237427 | A1* | 10/2006 | Logan | G07C 9/37 219/401 |
| 2013/0067375 | A1* | 3/2013 | Kim | G06F 3/04842 715/769 |
| 2014/0252091 | A1* | 9/2014 | Morse | G06F 16/70 312/404 |
| 2017/0219276 | A1* | 8/2017 | Wang | G06V 10/454 |
| 2018/0335252 | A1* | 11/2018 | Oh | G06V 20/52 |

FOREIGN PATENT DOCUMENTS

| | | |
|---|---|---|
| JP | 2014-70740 A | 4/2014 |
| JP | 2016061556 A * | 4/2016 |
| KR | 10-2012-0117464 A | 10/2012 |
| KR | 10-2015-0127560 A | 11/2015 |
| KR | 10-1717520-81 | 3/2017 |
| KR | 10-2018-0081961 A | 7/2018 |

* cited by examiner

*Primary Examiner* — Jonathan Bradford
(74) *Attorney, Agent, or Firm* — Birch, Stewart, Kolasch & Birch, LLP

(57) ABSTRACT

Disclosed is a method of storing food in an artificial intelligent refrigerator including obtaining an image of a storage chamber through a camera installed in the storage chamber of the refrigerator; transmitting the obtained image to a server; receiving a recognition result of food newly stored in the storage chamber through AI image processing in the server from the server; and displaying notifying information related to the food in a display unit of the refrigerator based on the received result.

9 Claims, 15 Drawing Sheets

ARTIFICIAL INTELLIGENT REFRIGERATOR AND METHOD OF STORING FOOD THEREOF

CROSS REFERENCE TO RELATED APPLICATIONS

This application is the National Phase of PCT International Application No. PCT/KR2019/006963, filed on Jun. 10, 2019, which is hereby expressly incorporated by reference into the present application.

TECHNICAL FIELD

The present invention relates to a refrigerator and a method of storing food thereof operating based on artificial intelligence.

BACKGROUND ART

A refrigerator is an electronic product used for freshly storing foods for a long period of time. However, until now, the refrigerator has been an electronic product that simply stores food, but as the society changes, the refrigerator is changing to various forms by reflecting social demands.

DISCLOSURE

Technical Problem

The present invention has been made in view of the above technical background and provides a refrigerator and a method of controlling the same for identifying food stored in the refrigerator and providing customized information according to the identified food.

Technical Solution

In an embodiment of the present invention, a method of storing food in an artificial intelligent refrigerator includes obtaining an image of a storage chamber through a camera installed in the storage chamber of the refrigerator; transmitting the obtained image to a server; receiving a recognition result of food newly stored in the storage chamber from the server through AI image processing in the server; and displaying notifying information related to the food in a display unit of the refrigerator based on the received result.

The image of the storage chamber may include a first image obtained at an opening time of a door of the refrigerator and a second image obtained at a closing time of the door of the refrigerator after the first image is obtained.

The displaying of notifying information may include extracting search data including a name, a production date, and a manufacturer of the food from an image transmitted to the server and receiving a search result of an accident history from the server based on the extracted data; and generating, when the accident history exists, the notifying information including accident contents and an image related to the food based on the found accident history.

The method may further include, after displaying the notification information, obtaining a new image of the storage chamber in which the food is stored; transmitting the new image to the server; comparing the new image with the previously obtained image and receiving a result determining whether the food is being stored at the storage chamber from the server; and displaying again the notifying information in the display unit when the food is being stored at the storage chamber.

The notification information may be a message guiding a storage method of the food, and the message may include a first area that describes a storage method of the food and a second area including an image that describes the storage method.

The refrigerator may further include a plurality of shelves for partitioning the storage chamber into a plurality of storage compartments, the camera may be separately installed in each of the plurality of storage compartments, and the storage image may be an image obtained when the camera photographs each of the plurality of storage compartments.

The notification information may be a message notifying a recipe using the food as an ingredient, and the message may include an image that describes the recipe.

An artificial intelligent refrigerator for storing food according to another embodiment of the present invention includes a memory for storing data; and a processor for controlling an operation of the refrigerator, wherein the processor obtains an image of a storage chamber through a camera installed in the storage chamber of the refrigerator; transmits the obtained image to a server; receives a recognition result of food newly stored in the storage chamber from the server through AI image processing in the server; and displays notifying information related to the food based on the received result in a display unit of the refrigerator.

Advantageous Effects

According to an embodiment of the invention, when a user stores food in a refrigerator, the user can intuitively receive an accident history or a storage method of the stored food to use the refrigerator more conveniently.

MODE FOR INVENTION

Figure 1:
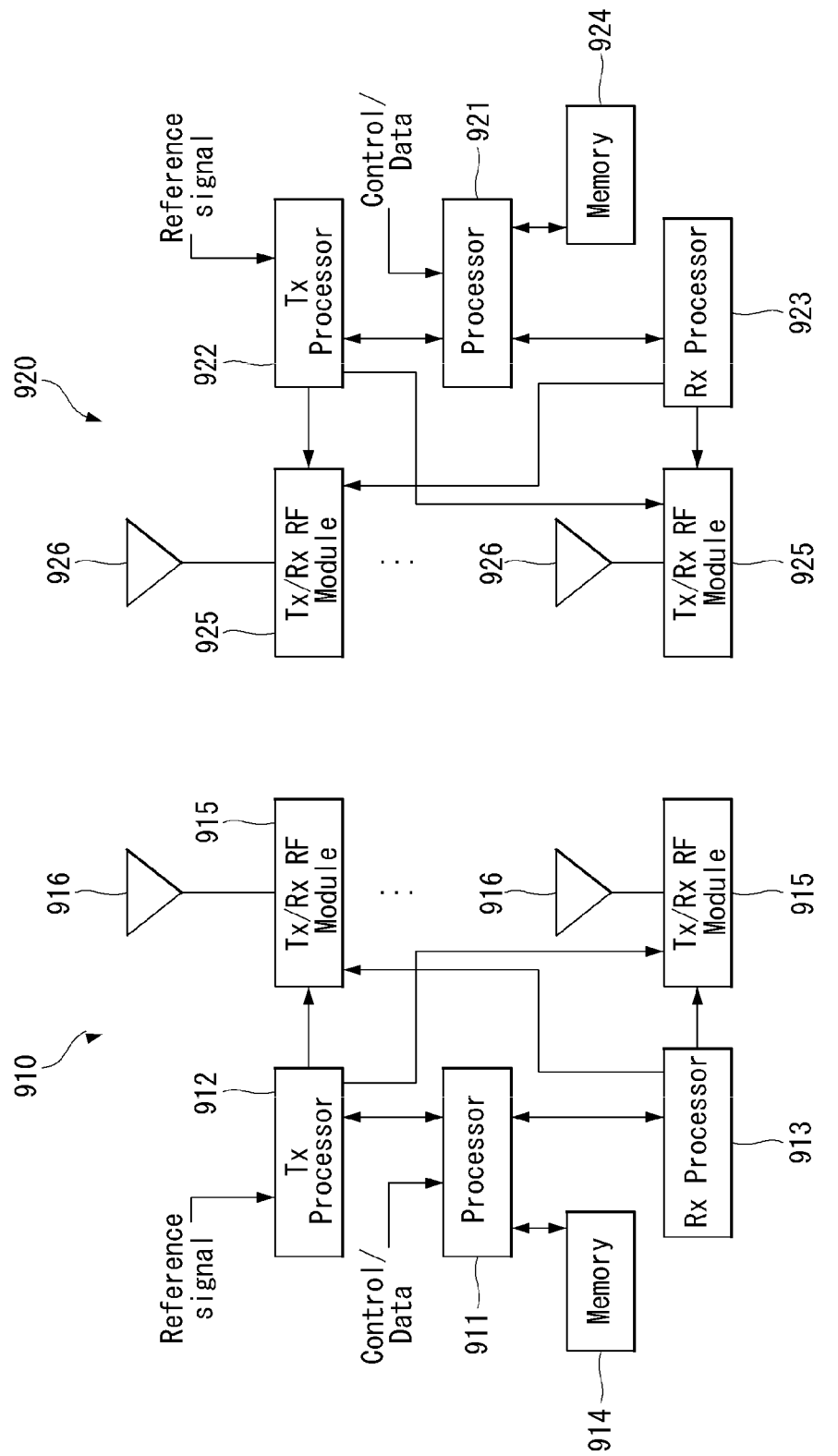
FIG. 1 illustrates a block diagram of a wireless communication system to which methods proposed in the present specification may be applied.

The advantages and features of the present invention and a method of achieving them will become apparent with reference to the embodiments described in detail below together with the accompanying drawings. However, it should be understood that the present invention is not limited to the embodiments described below, but may be implemented in various other forms and the embodiments are provided so that the disclosure of the present invention is fully complete and that those skilled in the art will fully appreciate the scope of the invention, and the present invention is defined by only the scope of the claims.

The shapes, sizes, ratios, angles, numbers, and the like disclosed in the drawings for describing embodiments of the present invention are illustrative, and thus the present invention is not limited thereto. Like reference numerals designate like elements throughout the specification. When terms "comprising", "having", "including', or the like are used in the present invention, unless the term 'only' is not used, the other part may be added. Unless the context otherwise clearly indicates, words used in the singular include the plural, the plural includes the singular.

In interpreting components, it is construed to include an error range even if there is no explicit description.

In the case of a description of the positional relationship, for example, when the positional relationship between two parts is described such as "on", "above", "under", and "next to", if "immediate" or "direct" is not used, one or more other parts may be located between the two parts.

The first, the second and the like may be used for describing various components, but these components are not limited by these terms. These terms are used for only distinguishing one component from another component.

Therefore, a first component described below may be a second component within the scope of the present invention.

Unless the context otherwise clearly indicates, words used in the singular include the plural, the plural includes the singular.

Hereinafter, an embodiment of the present invention will be described in detail with reference to the attached drawings. Further, detailed descriptions of well-known functions and structures incorporated herein may be omitted to avoid obscuring the subject matter of the present invention.

A. Example of Block Diagram of UE and 5G Network

FIG. 1 is a block diagram of a wireless communication system to which methods proposed in the disclosure are applicable.

Referring to FIG. 1, a device (autonomous device) including an autonomous module is defined as a first communication device (910 of FIG. 1), and a processor 911 can perform detailed autonomous operations.

A 5G network including another vehicle communicating with the autonomous device is defined as a second communication device (920 of FIG. 1), and a processor 921 can perform detailed autonomous operations.

The 5G network may be represented as the first communication device and the autonomous device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
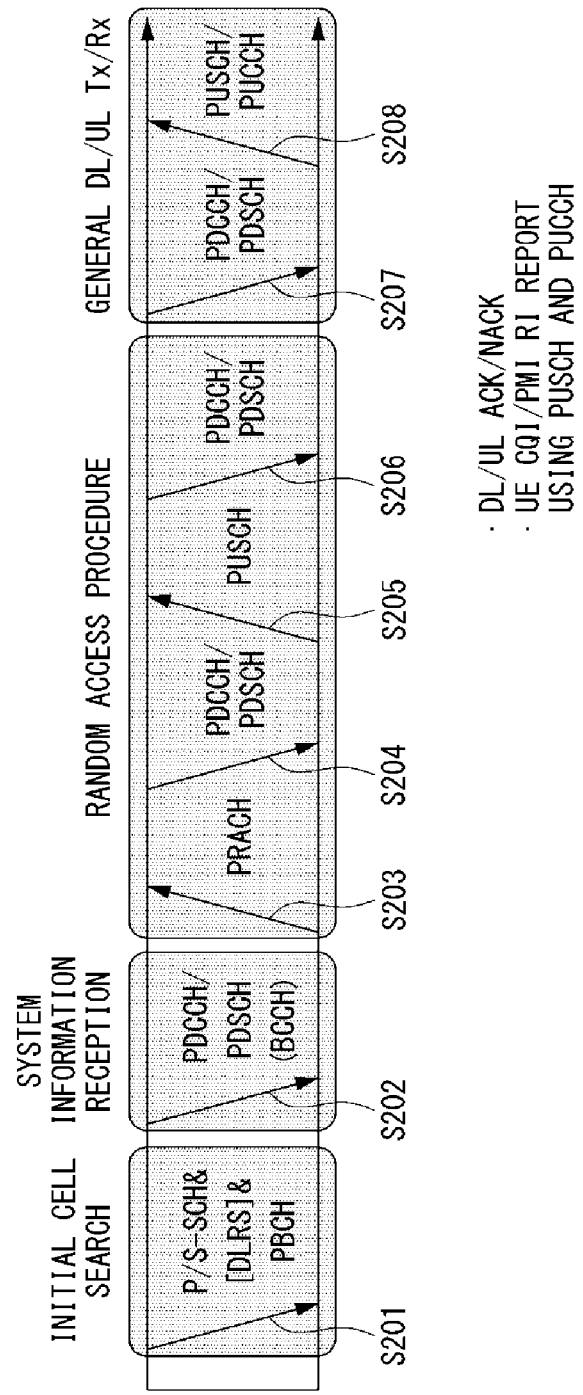
FIG. 2 is a diagram illustrating an example of a 3GPP signal transmission/reception method.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.

The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof.

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between Autonomous Vehicles Using 5G Communication

Figure 3:
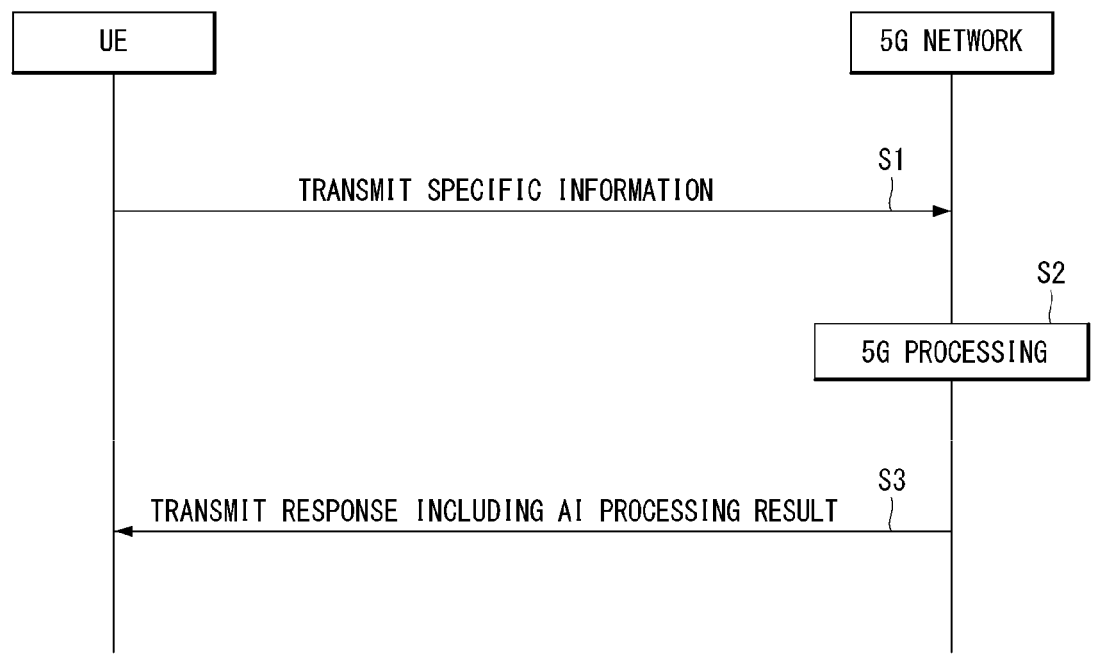
FIG. 3 illustrates an example of a basic operation of a user terminal and a 5G network in a 5G communication system.

FIG. 3 shows an example of basic operations of an autonomous vehicle and a 5G network in a 5G communication system.

The autonomous vehicle transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the autonomous vehicle (S3).

G. Applied Operations Between Autonomous Vehicle and 5G Network in 5G Communication System Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present invention which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present invention which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present invention which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present invention which will be described later and applied or can complement the methods proposed in the present invention to make technical features of the methods concrete and clear.

Figure 4:
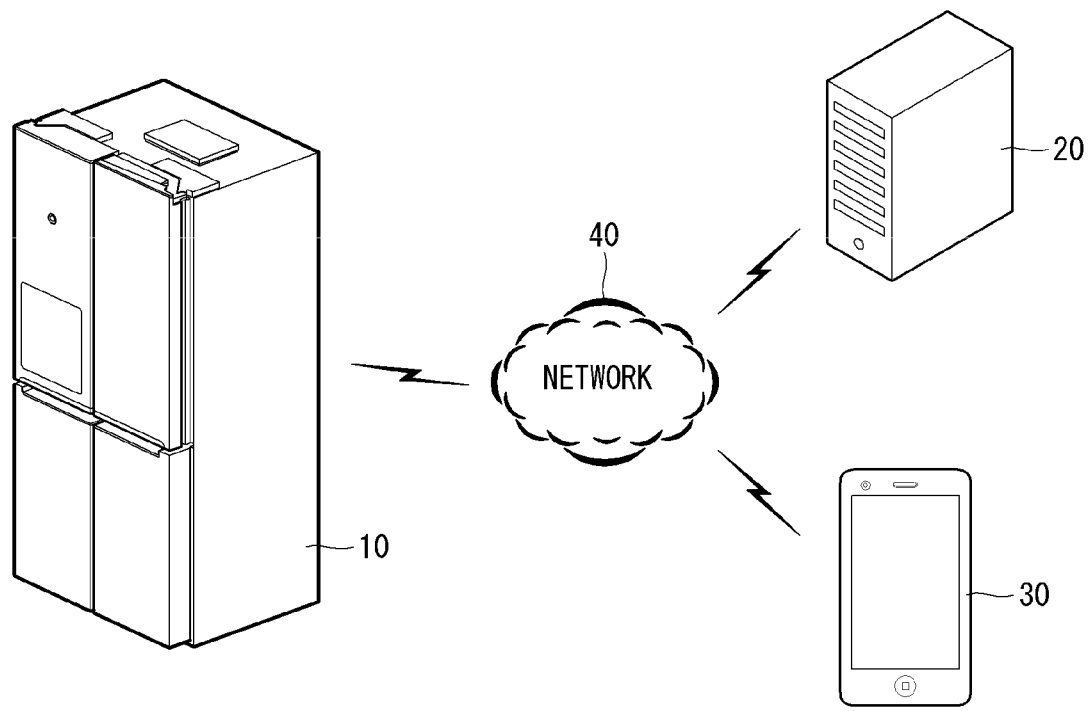
FIG. 4 is a block diagram illustrating a system configuration of a refrigerator operating based on a 5G network.

FIG. 4 illustrates a schematic configuration of a system implemented to perform 5G communication between components based on the above-mentioned 5G communication technology.

Referring to FIG. 4, the present invention may be implemented based on the above 5G communication technology, and a refrigerator 10, a server 20, and a user terminal 30 may be implemented to perform data communication with a delay time of substantially 1 to 3 ms based on the 5G communication.

The present invention may be performed in a system in which the refrigerator 10, the server 20, and the user terminal 30 are connected to perform data communication to a network 40 implemented according to the above-described 5G communication technology.

The server 20 may be a background server configured to process data according to a request transmitted from the user terminal 30 or the refrigerator 10 and to transmit the result to the user terminal 30 or the refrigerator 10 that requests data processing. As described above, the server 20 is connected to the user terminal 30 and the refrigerator 10 through the network 40 to which 5G communication technology is applied.

Further, the server 20 may perform operation processing based on artificial intelligence (AI) according to a request received from the user terminal 30 or the refrigerator 10 through the network 40 and transmit the result to the user terminal 30 or the refrigerator 10. Alternatively, an AI module may be optionally built into the refrigerator 10.

The AI module may include many modules that may perform AI processing.

AI processing may include all operations for data operation processing to be described below. For example, by performing AI processing of sensed data or obtained data, the AI module may perform processing/determination and control signal generation operations. Further, for example, the AI module may perform AI processing of the received data to perform the control of an intelligent electronic device.

The AI module may be a client device directly using an AI processing result or may be a device of a cloud environment that provides the AI processing result to another device.

The AI module may learn a neural network using programs stored in a memory by computing to learn the neural network. In particular, the AI module may learn a neural network for recognizing image analysis and speech recognition related data. Here, the neural network may be designed to simulate a human brain structure on a computer and include a plurality of network nodes having a weight and simulating a neuron of the human neural network. The plurality of network modes may exchange data according to each connection relationship so as to simulate a synaptic activity of neurons that send and receive signals through a synapse. Here, the neural network may include a deep learning model developed in a neural network model. In the deep learning model, while a plurality of network nodes is located in different layers, the plurality of network nodes may send and receive data according to a convolution connection relationship. The neural network model may include, for example, various deep learning techniques such as deep neural networks (DNN), convolutional deep neural networks (CNN), Recurrent Boltzmann Machine (RNN), Restricted Boltzmann Machine (RBM), deep belief networks (DBN), and a deep Q-network.

The AI module for performing the above-described function may be a general-purpose processor (e.g., CPU), but may be an AI dedicated processor (e.g., GPU) for learning AI.

The AI module may include a data learning unit that learns the neural network for data classification/recognition. The data learning unit may learn learning data to use in order to determine data classification/recognition and a criterion for classifying and recognizing data using learning data. By obtaining learning data to be used for learning and applying the obtained learning data to a deep learning model, the data learning unit may learn a deep learning model.

The data learning unit may be produced in at least one hardware chip form to be mounted in the AI module. For example, the data learning unit may be produced in a dedicated hardware chip form for artificial intelligence (AI) and may be produced in a part of a general-purpose processor (CPU) or a graphic dedicated processor (GPU) to be mounted in the AI module. Further, the data learning unit may be implemented into a software module. When the data learning unit is implemented into a software module (or program module including an instruction), the software module may be stored in non-transitory computer readable media. In this case, at least one software module may be provided by an Operating System (OS) or may be provided by an application.

The data learning unit may include a learning data acquisition unit and a model learning unit.

The learning data acquisition unit may obtain learning data necessary for a neural network model for classifying and recognizing data. For example, the learning data acquisition unit may obtain vehicle data and/or sample data for inputting as learning data to the neural network model.

The model learning unit may learn to have a determination criterion in which a neural network model classifies predetermined data using the obtained learning data. In this case, the model learning unit may learn a neural network model through supervised learning that uses at least a portion of the learning data as a determination criterion. Alternatively, the model learning unit may learn the neural network model through unsupervised learning that finds a determination criterion by self-learning using learning data without supervision. Further, the model learning unit may learn the neural network model through reinforcement learning using feedback on whether a result of situation determination according to learning is correct. Further, the model learning unit may learn the neural network model using learning algorithm including error back-propagation or gradient decent.

When the neural network is learned, the model learning unit may store the learned neural network model in the memory. The model learning unit may store the learned neural network model in a memory of a server connected to the AI module by a wired or wireless network.

In order to improve an analysis result of a recognition model or to save a resource or a time necessary for generation of a recognition model, the data learning unit may further include a learning data pre-processor and a learning data selecting unit.

The learning data pre-processor may pre-process obtained data so that the obtained data may be used in learning for situation determination. For example, the learning data pre-processor may process the obtained data in a predetermined format so that the model learning unit uses obtained learning data for learning for image recognition.

Further, the learning data selection unit may select data necessary for learning among learning data obtained from the learning data obtaining unit or learning data pre-processed in the pre-processor. The selected learning data may be provided to the model learning unit. For example, by detecting a specific area of an image obtained through a camera of an intelligent electronic device, the learning data selection unit may select only data of an object included in the specified area as learning data.

Further, in order to improve an analysis result of the neural network model, the data learning unit may further include a model evaluation unit.

The model evaluation unit inputs evaluation data to the neural network model, and when an analysis result output from evaluation data does not satisfy predetermined criteria, the model evaluation unit may enable the model learning unit to learn again. In this case, the evaluation data may be data previously defined for evaluating a recognition model. For example, when the number or a proportion of evaluation data having inaccurate analysis results exceeds a predetermined threshold value among analysis results of a learned recognition model of evaluation data, the model evaluation unit may evaluate evaluation data as data that do not satisfy predetermined criteria.

Further, a result value obtained based on the AI module may be transmitted to the refrigerator 10 through the network 40 to be displayed in a display unit 21 or the user terminal 30.

The user terminal 30 is an electronic device configured to request or receive data processing to or from the server 20 or the refrigerator 10 through the network 40 to provide a corresponding function and may be a smart phone, a laptop computer, a notebook computer, a smart TV, or a wearable device having such a function. The user terminal 30 may be connected to the network 40 to be registered in the network through a predetermined procedure for connecting in advance to the network so as to transmit or receive a specific command or message.

The user terminal 30 is not necessarily connected to the refrigerator 10 through the network, but may be connected to the refrigerator 10 to perform data communication through Wi-Fi communication or a home network capable of performing short-range communication.

The refrigerator 10 may include various sensors installed therein. The sensors help to obtain necessary information related to food stored inside the refrigerator. The sensors include at least one of a temperature sensor, an odor sensor, a pressure sensor, a load sensor, a position sensor, an optical sensor, and the like and may be configured to obtain desired information by combining the sensors, as needed.

Further, the refrigerator 10 may include one or more cameras installed therein, and the camera may photograph the inside of the refrigerator whenever a specific condition is satisfied, obtain an inside image of the refrigerator at a time point of photographing, and acquire information necessary for operation processing such as a status, kind, and number of food stored in the refrigerator through the obtained image. In a preferred embodiment, the camera may operate to obtain necessary data by combining with the sensor.

A control method according to an embodiment of the present invention described hereinafter may be executed by each or associated operations of the refrigerator 10, the server 20, and the user terminal 30, and the following description is only an embodiment, and the present invention is not limited to the method. Further, for convenience of description, the following description exemplifies a case in which an AI module is implemented into the server 20.

Figure 5:
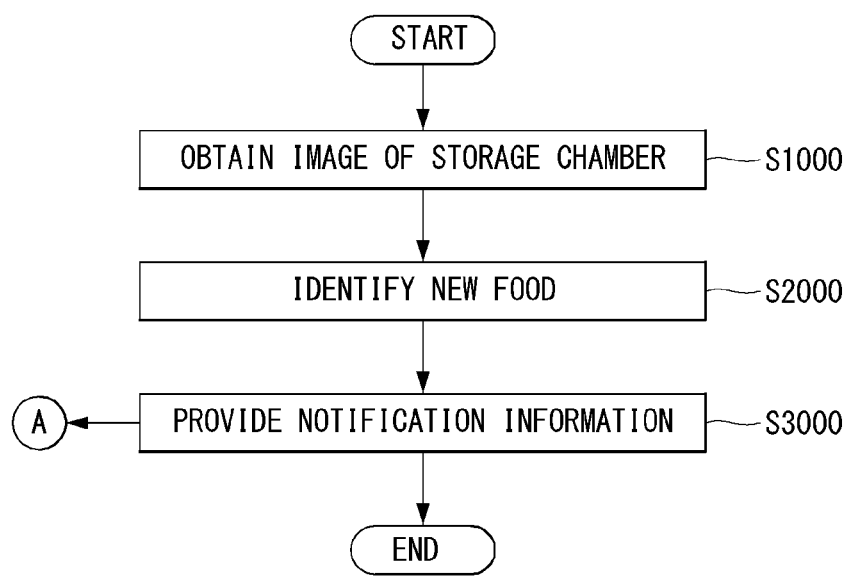
FIG. 5 is a flowchart illustrating a method of controlling a refrigerator according to an embodiment of the present invention.

FIG. 5 is a flowchart illustrating a method of controlling a refrigerator according to an embodiment of the present invention.

Referring to FIG. 5, a method of controlling an artificial intelligent refrigerator according to an embodiment of the present invention may include step (S1000) of obtaining an image of a storage chamber, step (S2000) of identifying food (hereinafter, new food) newly stored in the storage chamber, and step (S3000) of providing notification information related to new food to a user. Here, the notification information may be provided to the user through the user terminal or the display unit of the refrigerator in order to draw the user's attention with regard to a method of storing food in relation to new food, whether the food is food in which an accident has occurred in the past, and whether food has been stored in an appropriate storage chamber.

Step (S1000) of obtaining an image of the storage chamber is a process of determining food newly stored in the storage chamber of the refrigerator 10, and as an image of the storage chamber, at least two images obtained based on a specific time point may be used for recognizing newly stored food. In a preferred form, an image of the storage chamber may include a first image obtained at an opening time of a door of the refrigerator and a second image obtained at a closing time of the door of the refrigerator after obtaining the first image.

Step (S2000) of identifying new food is a step of determining whether food has been newly stored based on an image obtained at a storage time point. In this step, in order to effectively know newly added foods through images, AI image analysis may be used. Here, AI image analysis means image analysis using artificial intelligence and may be implemented through an AI module mounted in a server.

In step (S3000) of providing notification information related to new food, food newly stored in a storage chamber may be extracted by AI image analysis, and thus customized notification information of new food may be provided to the user. When a user simply stores new food in a refrigerator, the user may know a method of storing the food and know whether an accident has occurred in the food in the past.

Hereinafter, the refrigerator 10 according to an embodiment of the present invention is described with reference to FIGS. 6 to 7.

Figure 6:
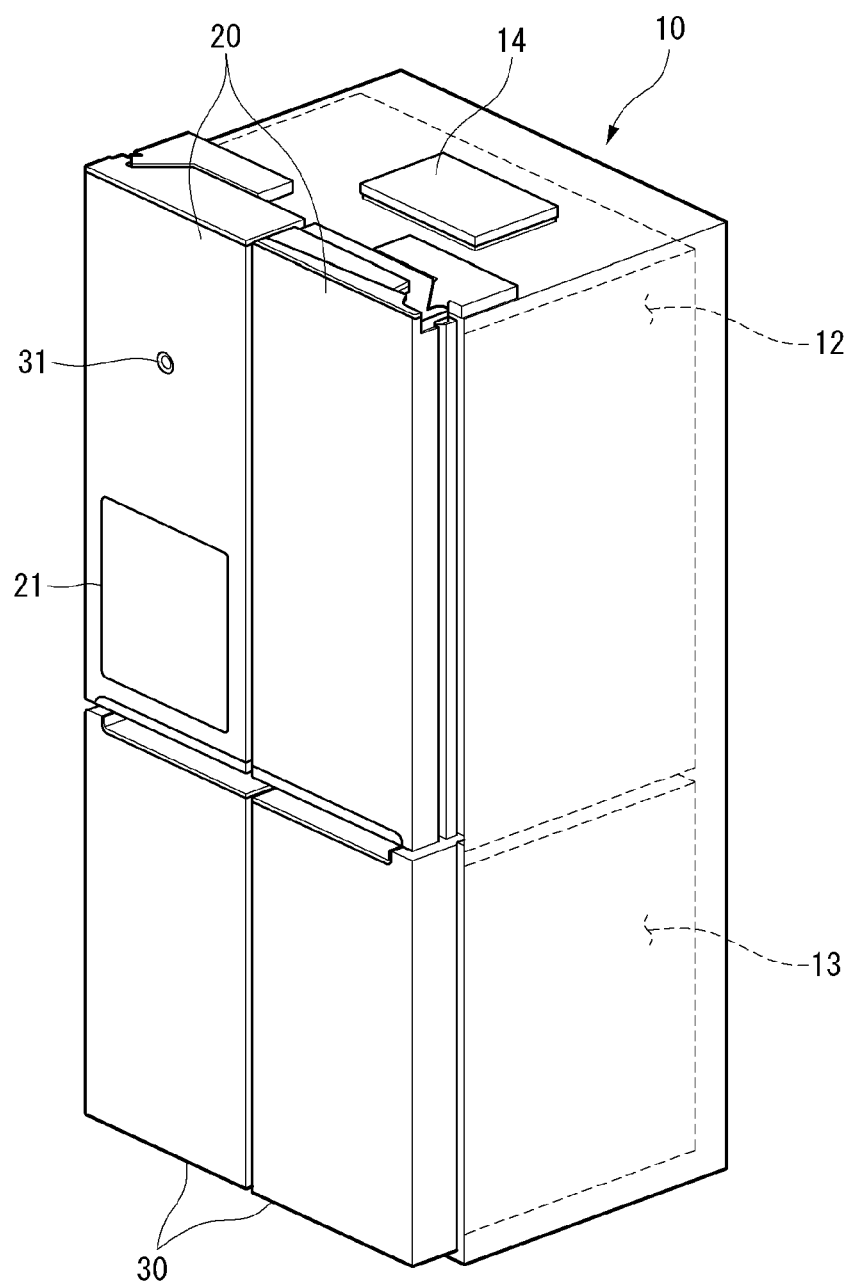
FIG. 6 is a perspective view illustrating an overall appearance of a refrigerator according to an embodiment of the present invention.
Figure 7:
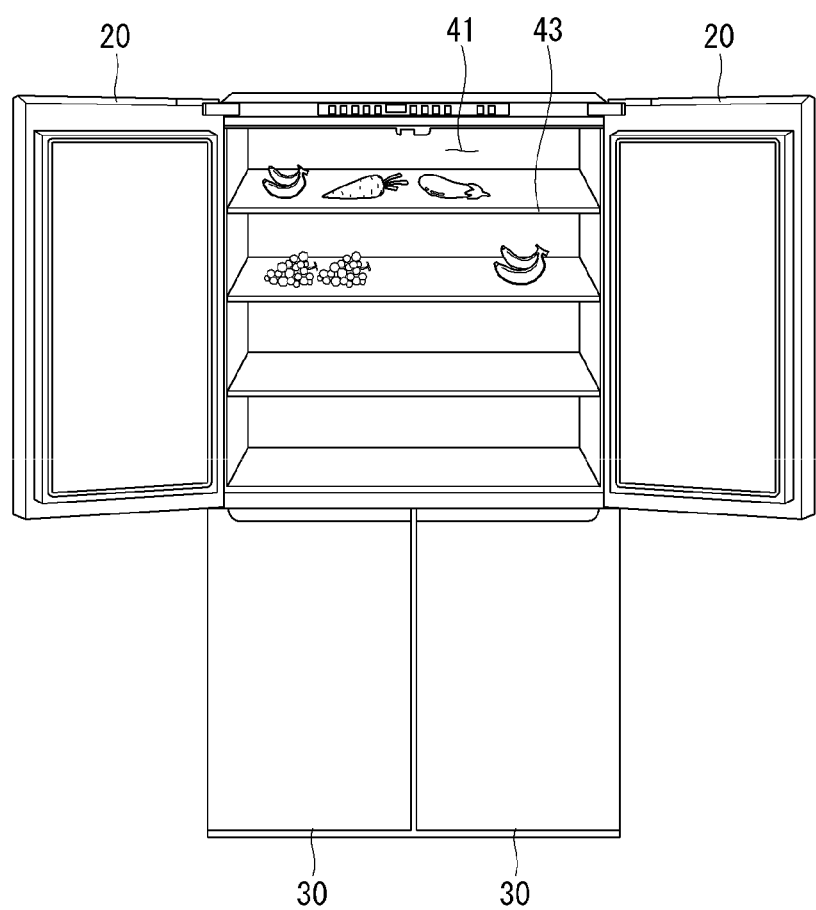
FIGS. 7 to 9 are diagrams illustrating an internal image of a storage chamber.

Referring to FIGS. 6 and 7, the refrigerator 10 has partitioned storage chambers 12 and 13 and may include doors 20 and 30 installed at an entrance of each of the storage chambers to open and close the storage chamber. For example, the storage chamber may include various forms of storages having different temperatures such as a cold-storage chamber and a freezing chamber, and in the drawing, it is illustrated that a storage is disposed in the form of in which a cold-storage chamber 12 is located at the upper side and in which a freezing chamber 13 is located at the lower side.

At one side of a main body 10, a control board 14 for controlling an overall operation of the refrigerator 10 may be located. The control board 14 performs a series of operation processing related to execution of the above-described control method as well as a series of operation processing necessary for storing food to perform a data communication operation necessary for the server 20 or the user terminal 30 or to control an operation of the refrigerator 10. The control board 14 may be referred to as a processor.

The storage may be a storage chamber including the cold-storage chamber 12 and the freezing chamber 13. A position of the cold-storage chamber 12 and the freezing chamber 13 is not limited to a shown position and may be variously changed. The cold-storage chamber 12 and/or the freezing chamber 13 may be divided into a plurality of chambers by shelves 42 so as to store food by dividing a space. In the drawing, it is illustrated that the storage chamber 41 is partitioned into four storage compartments 41a to 41d by the shelves 42.

In a preferred form, cameras for photographing an inside image of the storage chamber may be installed to correspond to each of the storage compartments 41a to 41d, and an inside image of the storage chamber may be more accurately obtained through such a configuration. As described above, a first camera C1 may be installed in an upper portion to photograph the first storage compartment 41a, and a second camera C2 may be installed in a lower portion of a first shelf that divides the first storage compartment 41a and a second storage compartment 41b so as to photograph the second storage compartment 41b. Further, the third and fourth cameras may be also installed in an upper portion of each storage compartment.

Figure 8:
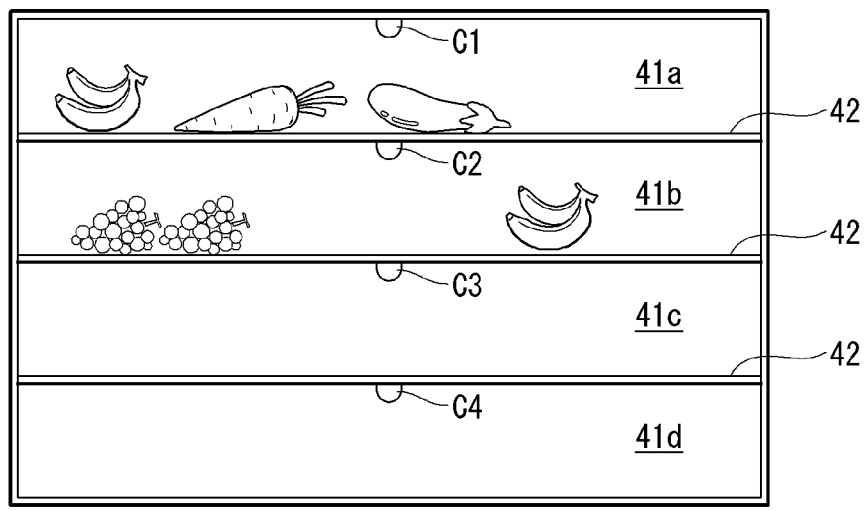
Figure 9:
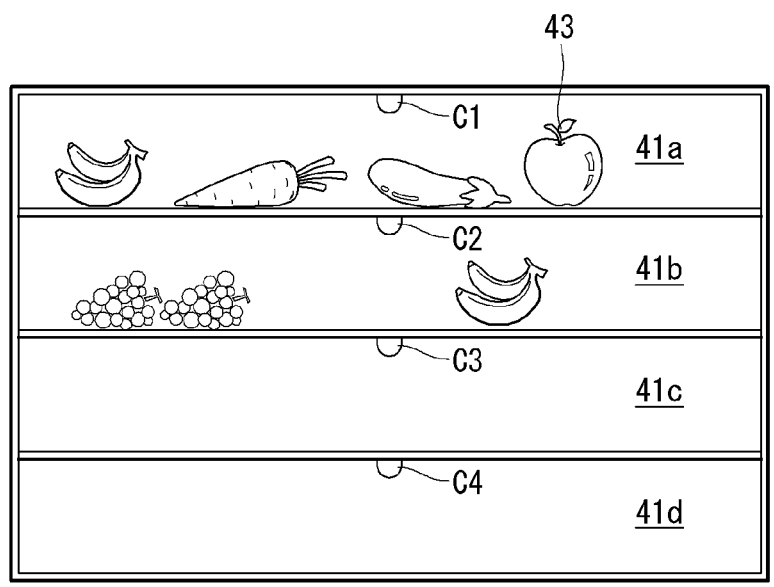

The processor 14 controls an operation of each of the first to fourth cameras 41a to 41d at opening and closing times of a door of the storage chamber to obtain a first image (image at an opening time of the door, see FIG. 8) and a second image (image at a closing time of the door, see FIG. 9) of each of storage compartments and transmit the obtained first image and second image to the server through the network. The AI module mounted in the server may determine food 43 in which the user newly adds to the refrigerator through AI image analysis. An operation processing result of the AI module may be transmitted to the refrigerator through the network and be referred to provide notification information related to the added food 43 to the user.

At one side of the outside of the cold-storage chamber door 20 or the freezing chamber door 30, the display unit 21 may be provided. In the drawing, it is illustrated that the display unit 21 is provided at one side of the cold-storage chamber door 20, but the scope of the present invention is not limited thereto. The display unit 21 may provide a user input unit (e.g., a touch input unit, a voice recognition input unit, and a gesture input unit) that enables the user to input a necessary command or information to the refrigerator 10 side. Further, the display unit 21 may function as an interface for displaying a series of messages or information processing result received through the network 40 in the user terminal 30 and the server 20.

Alternatively, the user may directly input food to store using the display unit 21 of the refrigerator 10 or the user terminal 30 as an interface. For this reason, for example, the refrigerator 10 may provide a user interface in order to input food to store in the display unit 21, and the user may register food to store in the refrigerator 10 through the user interface. When using the user terminal 30, a process of connecting the user terminal 30 to the refrigerator 10 may be preceded, and in this case, the user terminal 30 and the refrigerator 10 may be connected through the network 40, but more preferably, the user terminal 30 and the refrigerator 10 may be connected through Wi-Fi or Bluetooth for short range communication.

The processor 14 may detect opening of the doors 20 and 30 of the refrigerator and control an operation of the cameras C1 to C4 installed to correspond to each of the storage compartments 41a to 41d to obtain an image of the storage chamber at an opening time of the door. In this case, the obtained image may be a plurality of images obtained when the cameras C1 to C4 photograph the storage compartments 41a to 41d, respectively.

Further, after the door of the refrigerator is opened, at a closing time of the door, the processor 14 may control an operation of the cameras C1 to C4 to obtain an image of each of the storage compartments 41a to 41d. Here, an image obtained at an opening time of the door is referred to as a first image, and an image obtained at a closing time of the door is referred to as a second image.

The processor 14 may transmit the obtained first image (e.g., FIG. 8) and second image (e.g., FIG. 9) to the server through the network, and the AI module mounted in the server may enable the user to identify the food 43 newly added to the refrigerator through AI image analysis and rapidly transmit the result to the refrigerator 10 through the network in which 5G communication is available.

Figure 10:
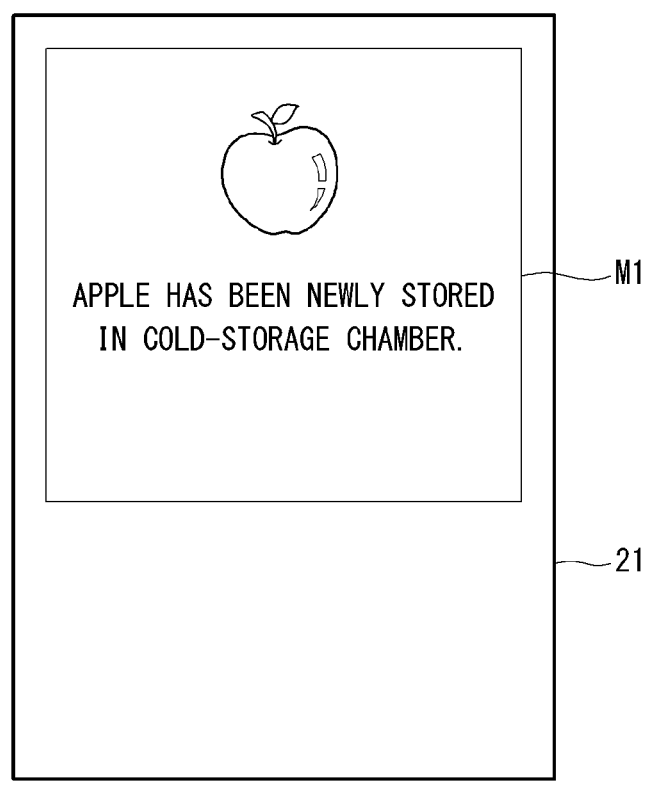
FIG. 10 is a diagram illustrating a shape of a display unit viewed in the case of storing food in a storage chamber.

FIG. 10 is a diagram illustrating an example of notification information displayed in the display unit 21 when the refrigerator 10 receives an image analysis result from the server. As illustrated in FIG. 10, the notification information may be provided to the user in a message form, and the processor 14, having received the image analysis result may generate a message M1 based on the received analysis result and operate to display the message M1 in the display unit 21. The message M1 may include an image of food newly added to the refrigerator, and a description related to the added food. Thereby, the user may easily check food stored in the refrigerator 10, and as described hereinafter, the user may easily know various notification information of newly stored food, i.e., a storage method or whether food in which an accident has occurred in the past.

Further, the notification information may be a message that guides an accident history related to food to the user. Hereinafter, this will be described with reference to FIG. 11.

The AI module, having received a first image and a second image from the refrigerator identifies food 43 (hereinafter, referred to as new food) in which the user newly adds to the refrigerator through AI image analysis (S3010, S3020) and extract search data such as a name, a production date, and a manufacturer of new food from the second image (S3030).

Thereafter, the AI module may search an accident history related to new food by learning based on the extracted search data (S3030) and transmit searching results to the refrigerator 10 through the network.

When there is no accident history as searching results (S3040), the processor 14 ends the step, and when there is an accident history as searching results, the processor 14 may generate a message M2 including accident contents, a food image, and an accident date related to new food based on the searching results received from the server (S3060) and display the generated message M2 in the display unit 21 (S3040) to guide accident contents to the user and to draw an attention to ingestion of food.

Figure 11:
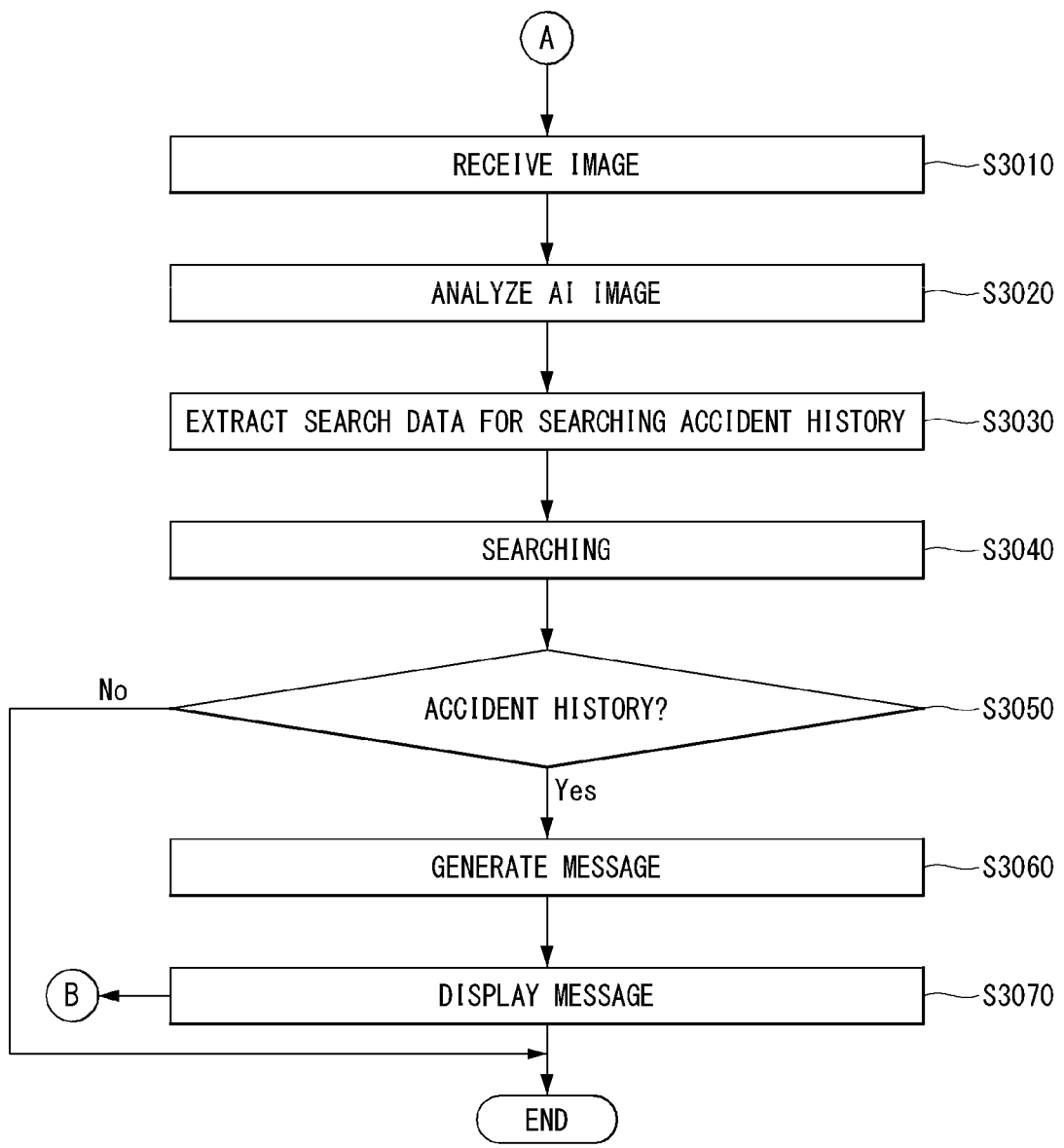
FIGS. 11 to 13 are diagrams illustrating a process of displaying accident information related to newly stored food.
Figure 12:
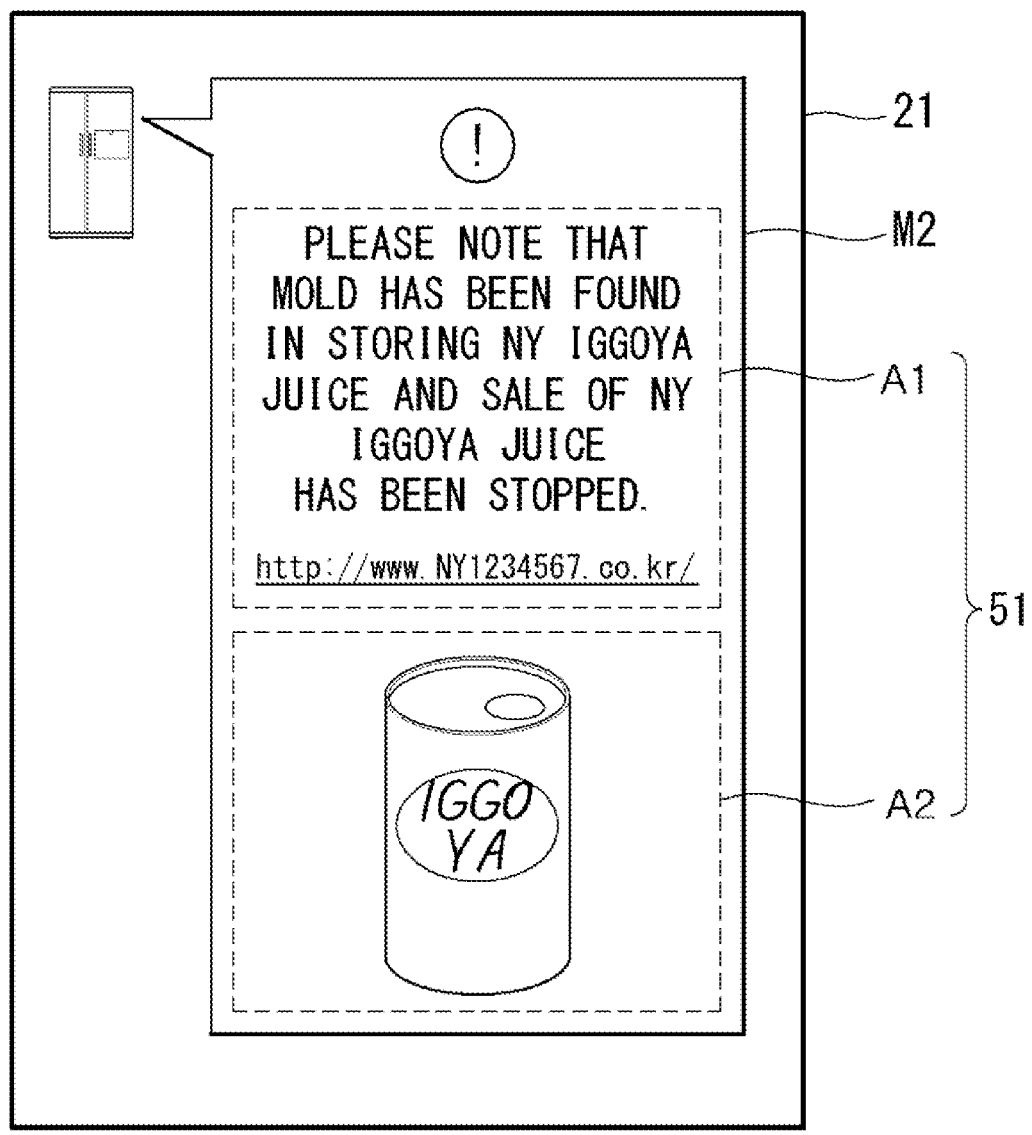

FIG. 12 is a diagram illustrating an example of a message M2 on an accident history described with reference to FIG. 11.

As shown, the message M2 may include a first area A1 that describes accident contents and a second area A2 including a food image, and the image may include an image (e.g., accident news) related to accident food as well as a still image. As the message M2 includes an image, the user may intuitively know an accident history related to food.

The first area may further include link information.

Figure 13:
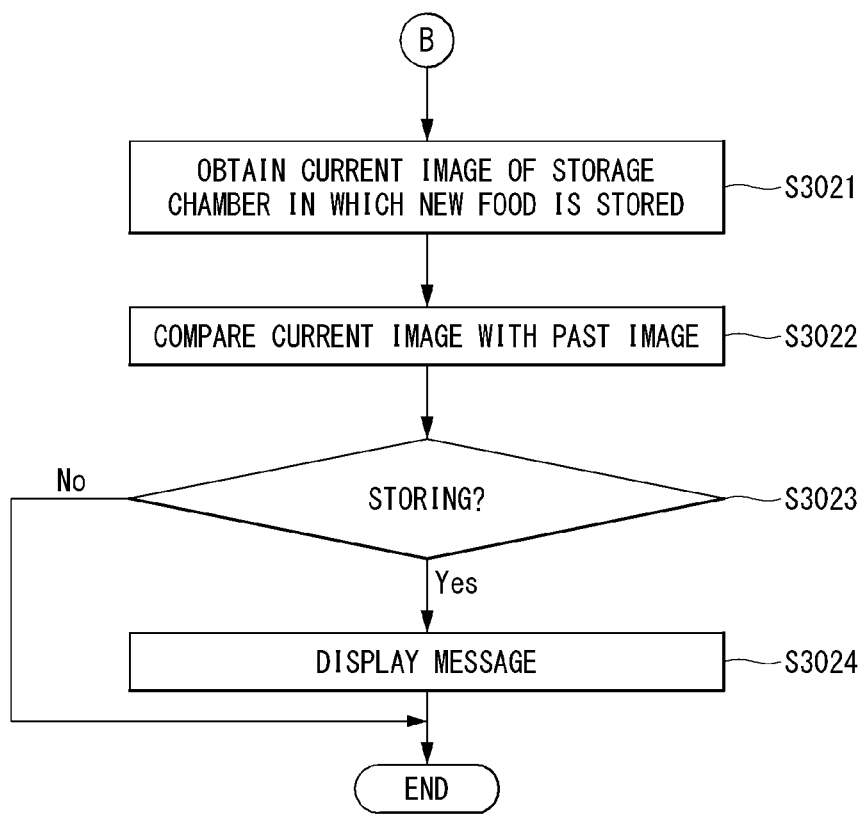

As described with reference to FIG. 13, the processor 14 may display the message M2 in step S3070 and then periodically obtain an image of the storage chamber in which new food is stored. The processor 14 may record an identifier that may identify the storage chamber at a time point of obtaining the first image in connection with the image and in this step, the processor 14 may periodically obtain an image of a storage chamber in which new food is stored based on the identifier regardless of opening of the door (S3021).

Thereafter, the processor 14 may transmit a new image obtained in the above step S3021 to the server through the network, and the AI module may compare a previously obtained image with a new image to determine whether new food is still being stored (S3023) and transmit the result to the refrigerator 10 through the network (S3022). Here, the past image and the new image may be matched based on the identifier As a determination result, if new food is not being stored, the processor 14 ends step, but if new food is still being stored, the processor 14 reads a message generated in step S3060 and stored in the memory to display again the message in the display unit 21 (S3024).

Figure 14:
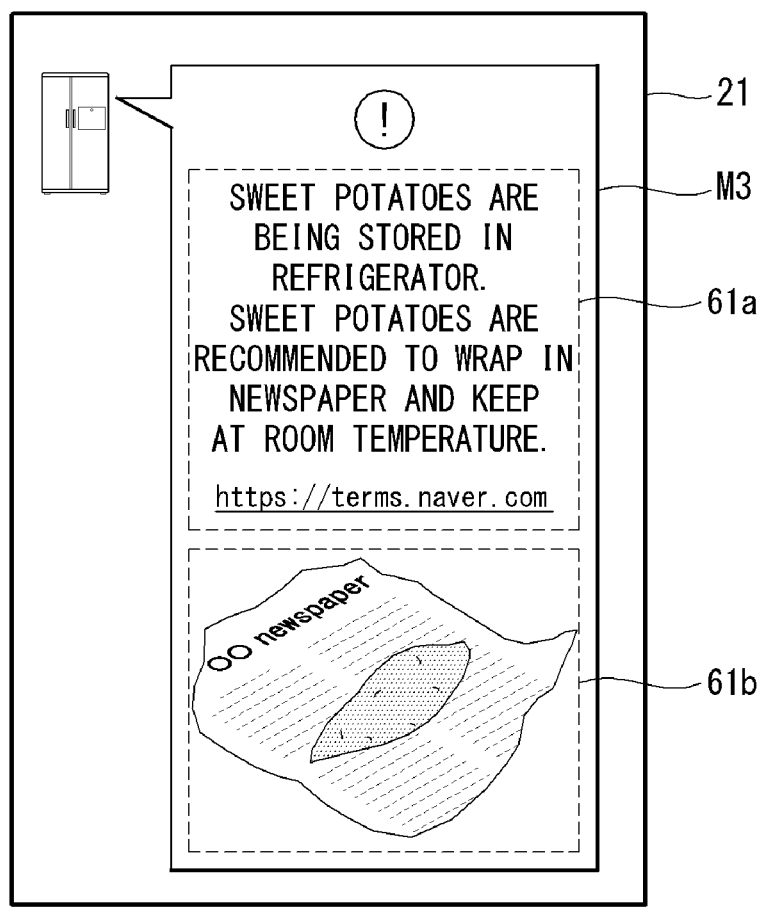
FIG. 14 is a diagram illustrating a screen that displays a storage method.

Notification information may be a message guiding a storage method of new food. FIG. 14 is a diagram illustrating an example of a message describing a storage method.

A message M3 may include a first area 61a and a second area 61b, the first area 61a may be an area including a text that describes a method of storing new food, and the second area 61b may be an area that describes a storage method as an image. Here, images may include both photos and video. Further, at least one area of the first area and the second area may further include link information connected to video or a text that describes in detail a storage method.

Such a message M3 may be displayed in the display unit 21 of the refrigerator 10 in a preferred form.

In the step S2000, when new food stored in the storage chamber is identified, the processor 14 may read a storage method stored in relation to the corresponding food stored in the memory based on the identified food to generate the message M3.

Alternatively, the server may identify new food through AI image analysis, obtain information on a storage method of new food through artificial intelligence or read a storage method stored in the memory in relation to the corresponding food and transmit the result to the refrigerator 10.

Figure 15:
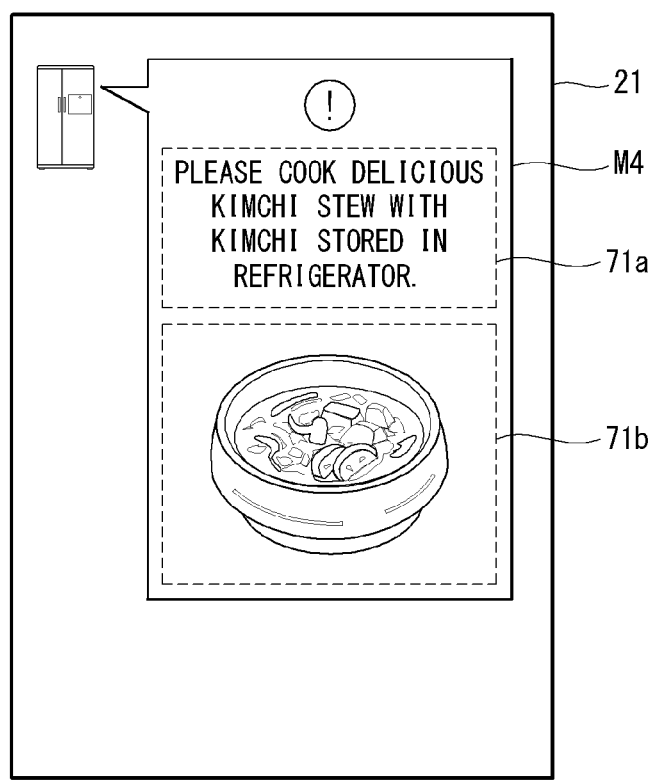
FIG. 15 is a diagram illustrating a screen that displays recipe information.

Further, the notification information may be recipe information using new food as an ingredient. FIG. 15 is a diagram illustrating an example of a message showing recipe information.

A message M4 may include a first area 71a and a second area 71b, the first area 71a may be an area including a text that describes a recommended recipe related to new food, and the second area 71b may be an area including an image that describes a recipe. Here, the image may preferably be video.

In step S2000, when new food stored in the storage chamber is identified, the processor 14 may read recipe information stored in the memory in relation to the corresponding food based on the identified food to generate the message M4.

Alternatively, the server may identify new food through AI image analysis and obtain recipe information of new food through artificial intelligence or read a recipe method stored in the memory in relation to the corresponding food, and transmit the result to the refrigerator 10.

The detailed description of the specification should not be construed as being limitative from all aspects, but should be construed as being illustrative. The scope of the present invention should be determined by reasonable analysis of the attached claims, and all changes within the equivalent range of the present invention are included in the scope of the present invention.

The invention claimed is:

1. A method of storing food in an artificial intelligent refrigerator, the method comprising:
obtaining an image of a storage chamber through a camera installed in the storage chamber of the refrigerator;
transmitting the obtained image to a server;
receiving a recognition result of food newly stored in the storage chamber through AI image processing in the server from the server; and
displaying notifying information related to the food in a display unit of the refrigerator based on the received result,
wherein the displaying of notifying information comprises:
extracting search data comprising a name, a production date, and a manufacturer of the food from the image transmitted to the server and receiving a search result of an accident history related to food safety based on the extracted data from the server; and
generating, when the accident history exists, the notifying information comprising accident contents and an image related to the food based on the found accident history, wherein the notification information is a message guiding a storage method of the food, wherein the message comprises a first area and a second area,
wherein the first area includes a text that describes a method of storing new food, and the second area describes the storage method as an image, and
wherein at least one area of the first area and the second area further includes link information connected to video or a text that describes the storage method.

2. The method of claim 1, wherein the image of the storage chamber comprises a first image obtained at an opening time of a door of the refrigerator and a second image obtained at a closing time of the door of the refrigerator after the first image is obtained.

3. The method of claim 1, further comprising:
after displaying the notification information,
obtaining a new image of the storage chamber in which the food is stored;
transmitting the new image to the server;
comparing the new image with the previously obtained image and receiving a result determining whether the food is being stored at the storage chamber from the server; and
displaying again the notifying information in the display unit when the food is being stored at the storage chamber.

4. The method of claim 1, wherein the refrigerator further comprises a plurality of shelves for partitioning the storage chamber into a plurality of storage compartments,
wherein the camera is provided in plurality, each of the plurality of cameras being separately installed in each of the plurality of storage compartments, and
wherein the storage image is an image obtained when the camera photographs each of the plurality of storage compartments.

5. The method of claim 1, further comprising:
establishing a communication connection with a server of 5G communication networks through a communication unit of the artificial intelligent refrigerator;
performing an initial access procedure with the artificial intelligent refrigerator by periodically transmitting a synchronization signal block (SSB);
performing a random access procedure with the artificial intelligent refrigerator;
transmitting an uplink (UL) grant to the artificial intelligent refrigerator for scheduling message transmission; and
performing a downlink beam management (DL BM) procedure using the SSB,
wherein the performing the DL BM procedure further includes:
transmitting a CSI-ResourceConfig IE including a CSI-SSB-ResourceSetList to the artificial intelligent refrigerator;
transmitting a signal on SSB resources to the artificial intelligent refrigerator; and
receiving a best SSBRI and corresponding RSRP from the artificial intelligent refrigerator.

6. An artificial intelligent refrigerator for storing food, the artificial intelligent refrigerator comprising:
a memory for storing data; and
a processor for controlling an operation of the refrigerator,
wherein the processor is configured to:
obtain an image of a storage chamber through a camera installed in the storage chamber of the refrigerator;
transmit the obtained image to a server;
receive a recognition result of food newly stored in the storage chamber through AI image processing in the server from the server; and
display notifying information related to the food in a display unit of the refrigerator based on the received result,
wherein the processor is configured to:
extract search data comprising a name, a production date, and a manufacturer of the food from the image transmitted to the server to receive a search result of an accident history related to food safety from the server based on the extracted data; and
generate, when the accident history exists, the notifying information comprising accident contents and an image related to the food based on the found accident history, wherein the notification information is a message guiding a storage method of the food, wherein the message comprises a first area and a second area,
wherein the first area includes a text that describes a method of storing new food, and the second area describes a storage method as an image, and
wherein at least one area of the first area and the second area further includes link information connected to video or a text that describes the storage method.

7. The artificial intelligent refrigerator of claim 6, wherein the image of the storage chamber comprises a first image obtained at an opening time of a door of the refrigerator and a second image obtained at a closing time of the door of the refrigerator after the first image is obtained.

8. The artificial intelligent refrigerator of claim 6, wherein the processor is configured to:
after displaying the notification information,
obtain a new image of the storage chamber in which the food is stored;
transmit the new image to the server;
compare the new image with the previously obtained image to receive a result determining whether the food is being stored at the storage chamber from the server; and display again the notifying information in the display unit when the food is being stored at the storage chamber.

9. The artificial intelligent refrigerator of claim 6, further comprising a plurality of shelves for partitioning the storage chamber into a plurality of storage compartments,
   wherein the camera is provided in plurality, each of the plurality of cameras being separately installed in each of the plurality of storage compartments, and
   wherein the storage image is an image obtained when the camera photographs each of the plurality of storage compartments.

\* \* \* \* \*